Patented Apr. 20, 1937

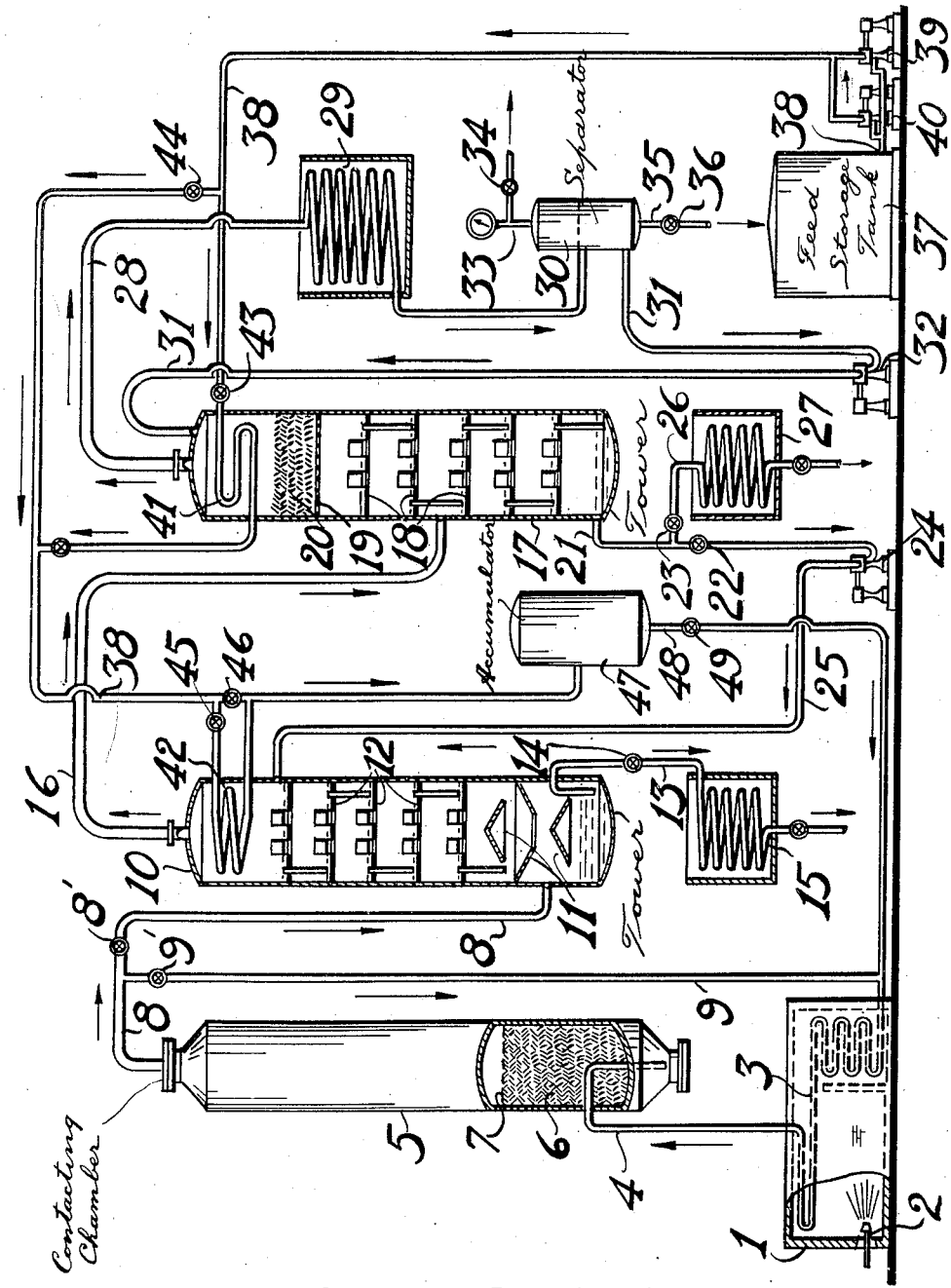

2,077,494

UNITED STATES PATENT OFFICE 2,077,494

PROCESS OF CLAY TREATING PETROLEUM DISTILLATES

Eugene R. Smoley, Fort Wayne, Ind., assignor to Standard Oil Development Company, a corporation of Delaware Application June 30, 1933, Serial No. 678,448

4 Claims. (Cl. 196—96)

This invention relates to improvements in refining petroleum distillates. The invention relates particularly to the treatment of light petroleum distillates, for example, gasoline used for motor fuel. The invention is also useful in the treatment of other petroleum distillates including petroleum solvent naphthas, petroleum cleaner's naphthas, petroleum varnish thinners, and the like.

Unrefined petroleum distillates usually contain objectionable constituents such as unsaturated compounds which tend to form gum and color imparting bodies and sulfur-containing compounds.

An object of this invention is to provide a process for substantially removing the objectionable constituents from the petroleum distillates.

This and other objects of the invention will be better understood by reference to the following description taken in connection with the accompanying drawing which illustrates diagrammatically and conventionally one form of apparatus to carry out the invention:

Referring to the drawing, numeral 1 denotes a furnace setting furnished with a burner 2 for supplying heat. Oil, such as cracking coil distillate, is circulated through a coil 3 in furnace setting 1 to vaporize the oil and raise the temperature to about 550° to 750° F. and it is passed through pipe 4 into a contacting chamber 5. Non-cracking conditions are maintained at all times and the pressure used is about 100 pounds per square inch, though higher or lower pressures may be used. A layer of clay 6 such as fuller's earth or granosil, etc. of 8 to 30 mesh, is maintained in the bottom of the contacting chamber 5 to the level 7. The depth of the clay layer is about 12 to 18 feet. The outlet of pipe 4 in contacting chamber 5 is below the surface of the clay in close proximity to the bottom of contacting chamber 5. The oil vapors after passing through the clay layer are withdrawn from chamber 5 through pipe 8 furnished with valve 8' to a lower part of fractionating tower 10. Pipe 9 arranged with valve 9' is provided for recirculating the oil through coil 3, pipe 4, and contacting chamber 5 in the beginning of the operation to raise the temperature of the oil vapors in the contacting chamber 5 to a desired temperature so that condensation of the vapors does not take place in the contacting chamber 5.

Fractionating tower 10 is provided with baffles 11 in the lower part and bubble cap plates 12 in the part above the baffles. Outlet pipe 13 provided with valve 14 is used to remove the condensed fractions from the bottom of fractionating tower 10 to storage (not shown) after passing through cooler 15.

The oil vapors passed into tower 10 are fractionated and the heavier fractions condensed and withdrawn through pipe 13. The resulting oil vapors are passed through pipe 16 from the top of fractionating tower 10 to a central point of contacting tower 17. Contacting tower 17 is provided with bubble cap plates 18 and a perforated plate or screen 19 at the upper part. A layer of clay 20 such as fuller's earth, granosil, etc. of 8 to 30 mesh is supported upon plate 19. An outlet pipe 21 arranged with valves 22 and 23 is used to withdraw the condensed vapors from the bottom of the tower. The condensed vapors may be passed by means of pump 24 through pipe 25 to the top plate of tower 10 to serve as reflux. The condensate may be in part or whole passed through pipe 21 to pipe 26 through condenser 27 to storage (not shown).

The vapors passed into contacting tower 17 are fractionated. The separated vapors are passed through the clay layer 20 and withdrawn through vapor line 28, condensed by passing through condenser 29 and passed into separating tank 30. A fraction of the condensate in separating tank may be passed through pipe 31 by means of pump 32 to the top of contacting tower 17 as reflux. Gases are withdrawn from separating chamber 30 through pipe 33 arranged with valve 34. The condensate is removed from separating tank 30 through pipe 35 arranged with valve 36 to storage (not shown).

The pressures are maintained substantially uniform throughout the system by means of the valves arranged on the outlet pipes.

The feed stock is supplied from storage tank 37 through pipe 38 provided with pumps 39 and 40. The feed stock may be preheated by circulating through one or both of the coils 41 and 42 placed in the top of contacting chamber 17 and fractionating tower 10. Valves 43, 44, 45 and 46 are provided on line 38 and are used to regulate the path of flow of the feed stock as it passes from storage tank 37 to accumulating tank 47. Feed stock is passed from accumulating tank 47 through pipe 48 arranged with valve 49 to heating coil 3.

Alternately an oil may be heated to the desired temperature, such as 550° to 750° F., and under pressure of about 100 pounds per square inch and passed through a body of clay maintained in the bottom of a clay contacting chamber similar to 5. The oil vapors after passing through the clay contacting chamber are passed directly to a fractionating tower similar to chamber 17 and fractionated. The condensed fractions formed in the fractionating tower are withdrawn from the bottom part and the remaining vapors passed through a layer of clay disposed in the upper part. The vapors that have passed through the layer of clay in the upper part of the fractionating tower are then withdrawn and condensed.

The invention has the following advantages: Objectionable constituents are removed and the oil is substantially unaffected in that the process does not involve the loss of constituents suitable as components of the desired products. The treated oil is substantially free from constituents introduced by an acid-alkali refining operation. The product is improved particularly as to color and corrosion and as to stability on exposure to sunlight. It has been found that very large yields of motor fuel distillate may be treated per ton of clay used. This means that a given charge of clay will last a very long time, giving continuous operation with a minimum of shut down time and a minimum clay cost per barrel of finished motor fuel produced.

The foregoing description is merely illustrative and various changes and alternative arrangements may be made within the scope of the appended claims in which it is my intention to claim all novelty as broadly as the prior art permits.

I claim:

1. A process of refining a hydrocarbon distillate derived from cracking containing objectionable unsaturates which comprises passing said distillate in vapor form after having been heated to a temperature above about 550° F. but below cracking temperature and while under superatmospheric pressure in the absence of added oxygen through a bed of solid adsorbent material capable of polymerizing objectionable unsaturates present in said distillate, maintaining said bed of solid adsorbent material at a temperature which will avoid condensation of vapors passing therethrough, thereafter passing the vapors so treated into a rectifying zone wherein progressive cooling of said vapors is effected and said vapors undergo extensive fractional condensation and rectification to separately condense a fraction consisting of higher boiling constituents of said vapors while retaining the constituents desired in the final distillate in vapor form, separately withdrawing the condensate so formed, passing the remaining fractionated vapors through a second bed of solid adsorbent material to effect further polymerization of objectionable unsaturates, and condensing and collecting the resulting treated vapors as the desired distillate product.

2. A process of refining a hydrocarbon distillate derived from cracking containing objectionable unsaturates which comprises passing said distillate in vapor form after having been heated to a temperature above about 550° F. but below cracking temperature and while under superatmospheric pressure in the absence of added oxygen through a bed of solid adsorbent material capable of polymerizing objectionable unsaturates present in said distillate, maintaining said bed of solid adsorbent material at a temperature which will avoid condensation of vapors passing therethrough, thereafter passing the vapors so treated into a first fractionating zone wherein said vapors are subjected to progressive cooling and rectification to condense and separate higher boiling constituents therefrom, separately removing liquid so condensed and separated, passing vapors remaining uncondensed in said fractionating zone into an intermediate point in a second fractionating zone wherein said vapors are subjected to further progressive cooling to condense a higher boiling fraction of said remaining vapors, passing uncondensed vapors from said second fractionating zone through a second bed of solid adsorbent material to effect further polymerization of objectionable unsaturates and condensing and collecting the last treated vapors as a desired distillate product.

3. A process of refining a hydrocarbon distillate derived from cracking containing objectionable unsaturates which comprises passing said distillate in vapor form after having been heated to a temperature above about 550° F. but below cracking temperature and while under superatmospheric pressure in the absence of added oxygen through a bed of solid adsorbent material capable of polymerizing objectionable unsaturates present in said distillate, maintaining said bed of solid adsorbent material at a temperature which will avoid condensation of vapors passing therethrough, thereafter passing the vapors so treated into a rectifying zone wherein progressive cooling of said vapors is effected and said vapors undergo extensive fractional condensation and rectification to separately condense a fraction consisting of higher boiling constituents of said vapors while retaining the constituents desired in the final distillate in vapor form, separately withdrawing the condensate so formed, passing the remaining fractionated vapors through a second bed of solid adsorbent material to effect further polymerization of objectionable unsaturates, passing a liquid reflux medium through said second bed in countercurrent contact with vapors passing therethrough to separate said polymers from said vapors and remove polymers formed from said bed and condensing and collecting vapors from said last-named treatment as a desired distillate product.

4. A process of refining a hydrocarbon distillate derived from cracking containing objectionable unsaturates which comprises passing said distillate in vapor form after having been heated to a temperature above about 550° F. but below cracking temperature and while under superatmospheric pressure in the absence of added oxygen through a bed of solid adsorbent material capable of polymerizing objectionable unsaturates present in said distillate, maintaining said bed of solid adsorbent material at a temperature which will avoid condensation of vapors passing therethrough, thereafter passing the vapors so treated into a rectifying zone containing no solid adsorbent material wherein progressive cooling of said vapors is effected and said vapors undergo extensive fractional condensation and rectification to separately condense a fraction consisting of higher boiling constituents of said vapors while retaining the constituents desired in the final distillate in vapor form, separately withdrawing the condensate so formed, passing the remaining fractionated vapors through a second bed of solid adsorbent material to effect further polymerization of objectionable unsaturates, and condensing and collecting the resulting treated vapors as the desired distillate product.

EUGENE R. SMOLEY.